(12) United States Patent
Johansen et al.

(10) Patent No.: US 11,713,145 B2
(45) Date of Patent: Aug. 1, 2023

(54) VARIABLE PITCH STARWHEEL FOR CONTAINER CARRIER APPLICATING MACHINE

(71) Applicant: ILLINOIS TOOL WORKS INC., Glenview, IL (US)

(72) Inventors: Brian K. Johansen, Perryville, MD (US); Robert C. Beesley, Greenville, SC (US); Christopher J. Samaras, Tinley Park, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 427 days.

(21) Appl. No.: 16/802,900

(22) Filed: Feb. 27, 2020

(65) Prior Publication Data
US 2020/0283179 A1 Sep. 10, 2020

Related U.S. Application Data

(60) Provisional application No. 62/813,397, filed on Mar. 4, 2019.

(51) Int. Cl.
| | |
|---|---|
| *B65B 35/36* | (2006.01) |
| *B65G 47/26* | (2006.01) |
| *B65B 35/58* | (2006.01) |
| *B65G 47/84* | (2006.01) |
| *B65B 17/02* | (2006.01) |

(52) U.S. Cl.
CPC ............ *B65B 35/36* (2013.01); *B65B 17/025* (2013.01); *B65B 35/58* (2013.01); *B65G 47/26* (2013.01); *B65G 47/846* (2013.01); *B65G 2201/0252* (2013.01)

(58) Field of Classification Search
None
See application file for complete search history.

(56) References Cited

U.S. PATENT DOCUMENTS

| | | | |
|---|---|---|---|
| 5,058,724 A | 10/1991 | Hinton | |
| 6,308,816 B1 * | 10/2001 | Bankuty | ............... B67C 7/0006 198/395 |

(Continued)

FOREIGN PATENT DOCUMENTS

| | | |
|---|---|---|
| CN | 1350503 A | 5/2002 |
| CN | 101309844 A | 11/2008 |

(Continued)

OTHER PUBLICATIONS

EPO, English language version of the International Search Report, Form PCT/ISA/210 for International Application PCT/US2020/021001, dated May 26, 2020 (5 pages).

(Continued)

*Primary Examiner* — Kavel Singh
(74) *Attorney, Agent, or Firm* — Pauley Erickson & Swanson

(57) ABSTRACT

An applicating machine for applying a flexible carrier to a plurality of containers provided from an infeed includes an orienter for placing containers into a correct rotational position and a transfer device for transferring the oriented containers in a fixed rotational position to a jaw drum for applying a flexible carrier to a plurality of containers provided.

9 Claims, 6 Drawing Sheets

(56) References Cited

U.S. PATENT DOCUMENTS

| | | | |
|---|---|---|---|
| 7,849,998 B2 * | 12/2010 | Langlois | B29C 49/42069 |
| | | | 198/470.1 |
| 8,002,107 B2 * | 8/2011 | Balzarin | B65G 29/00 |
| | | | 198/470.1 |
| 9,415,951 B2 * | 8/2016 | Fahldieck | B08B 9/426 |
| 9,580,252 B2 * | 2/2017 | Yokobayashi | B65G 47/244 |
| 2003/0154694 A1 | 8/2003 | Peronek et al. | |
| 2004/0003573 A1 | 1/2004 | Moore | |
| 2010/0192525 A1 | 8/2010 | Lam et al. | |
| 2013/0036881 A1 | 2/2013 | Slovik et al. | |
| 2013/0174513 A1 | 7/2013 | Moore et al. | |

FOREIGN PATENT DOCUMENTS

| | | |
|---|---|---|
| CN | 109231809 A | 1/2019 |
| EP | 1 215 144 A1 | 6/2002 |
| TW | 200902409 A | 1/2009 |

OTHER PUBLICATIONS

EPO, English language version of the Written Opinion of the ISA, Form PCT/ISA/237 for International Application PCT/US2020/021001, dated May 26, 2020 (9 pages).

* cited by examiner

VARIABLE PITCH STARWHEEL FOR CONTAINER CARRIER APPLICATING MACHINE

CROSS REFERENCE TO RELATED APPLICATIONS

This application claims priority to U.S. Provisional Application Ser. No. 62/813,397, filed on 4 Mar. 2019. This U.S. Provisional Application is hereby incorporated by reference herein in its entirety and is made a part hereof, including but not limited to those portions which specifically appear hereinafter.

BACKGROUND OF THE INVENTION

Field of the Invention

This invention relates to a system for transferring containers within a carrier applicating machine.

Description of Prior Art

Container carriers connect two or more containers into a sturdy unitized package or "multipack" of containers. Carriers are generally planar arrays of rings, sometimes referred to as "six-pack carriers," typically formed from a thermoplastic sheet material. Carriers are applied to containers of various sizes and shapes.

The unitized containers are generally randomly oriented so that each container is positioned in a different rotational orientation within the carrier. This random orientation results in inconsistencies related to displaying the package, particularly the container's trademark and graphics. In addition, it is often preferable to ensure that UPC labels on the respective containers are oriented correctly, either facing inward or outward.

According to one method know in the art, individual containers are rotated, either manually or mechanically, into a preferred orientation after packaging randomly oriented containers in the container carrier. Rotation of the containers once the containers are engaged within the container carrier may destroy the integrity of the container carrier through excessive torque applied to the respective thermoplastic rings within the container carrier. Alternatively, rotation of the containers may be impossible once the containers are sealed within shrink-wrapped or similar packages known to those having ordinary skill in the art.

Existing orientation systems enable containers to be rotated into a desired rotational position and then engaged with the container carrier to fix the desired rotational position within the package. However, difficulties arise between orientation and transfer to the container carrier, particularly in maintaining the desired orientation as containers travel between the orienter and engagement within the container carrier.

Therefore, a need exists for a system and method of transferring oriented containers, of all sizes, to a container carrier and a resulting package.

SUMMARY OF THE INVENTION

According to one preferred embodiment of this invention, a system for packaging containers preferably cooperates with an inlet conveyor and a jaw drum. An orienter preferably accepts a plurality of containers from the inlet conveyor and singularizes each container and then rotates each container into a desired rotational position for presentation to a starwheel or "transfer device."

The starwheel preferably includes a central wheel and a corresponding radial position cam and angle position cam. A plurality of can grippers are preferably arranged around the central wheel. Each can gripper preferably includes a radial follower that engages with the radial position cam and an angle follower that engages with the angle position cam.

Each cam gripper therefore includes a radial follower that moves with the radial position cam to adjust a radial position of the can gripper as it rotates around the central wheel and an angle follower that moves with the angle position cam to adjust an angular position of the can gripper as it rotates around the central wheel. In this manner, containers can be provided to a transfer device at a first pitch and a first centerline and transferred in a fixed angular position to a second pitch and a second centerline. This permits the subject system to orient and transfer containers from a continuous input to a desired position at the jaw drum for unitization.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
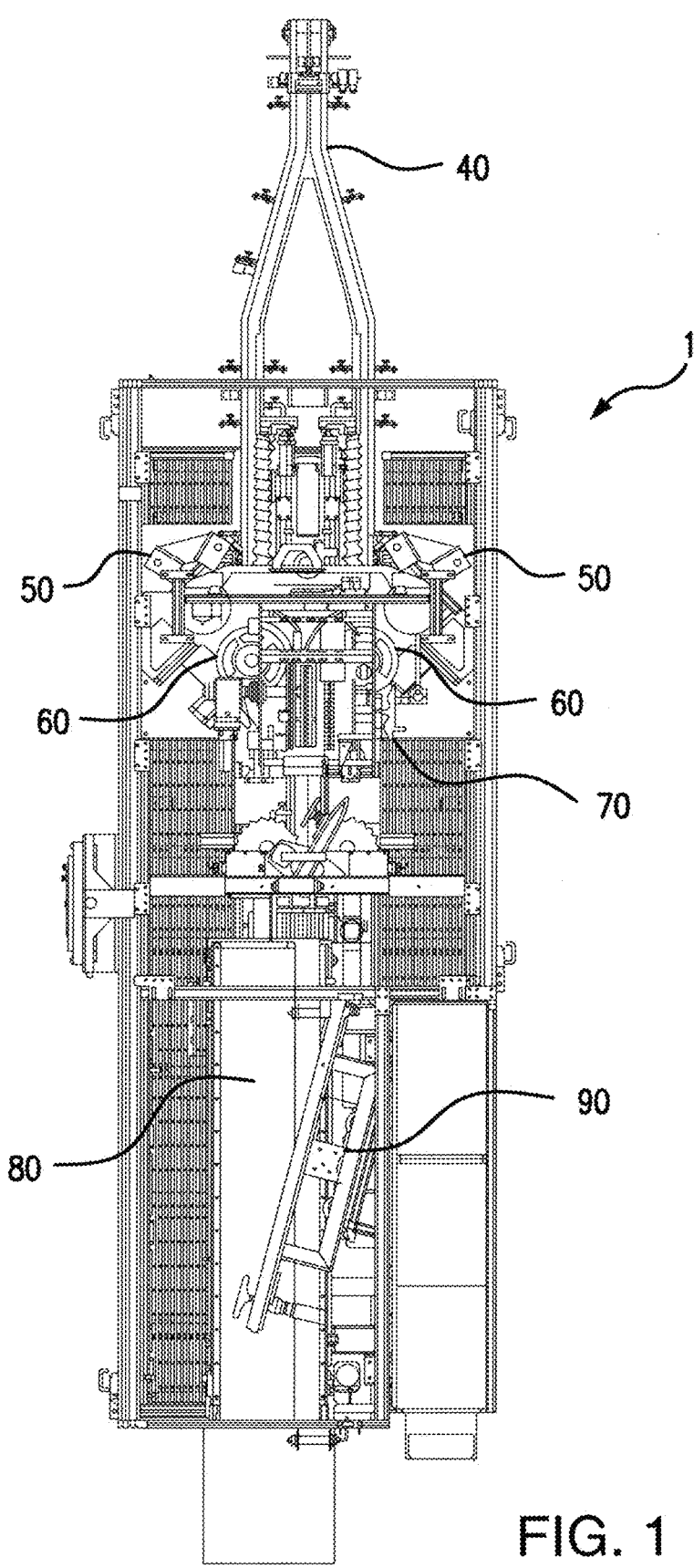
FIG. 1 is a top view of a packaging machine according to one preferred embodiment of this invention.
Figure 2:
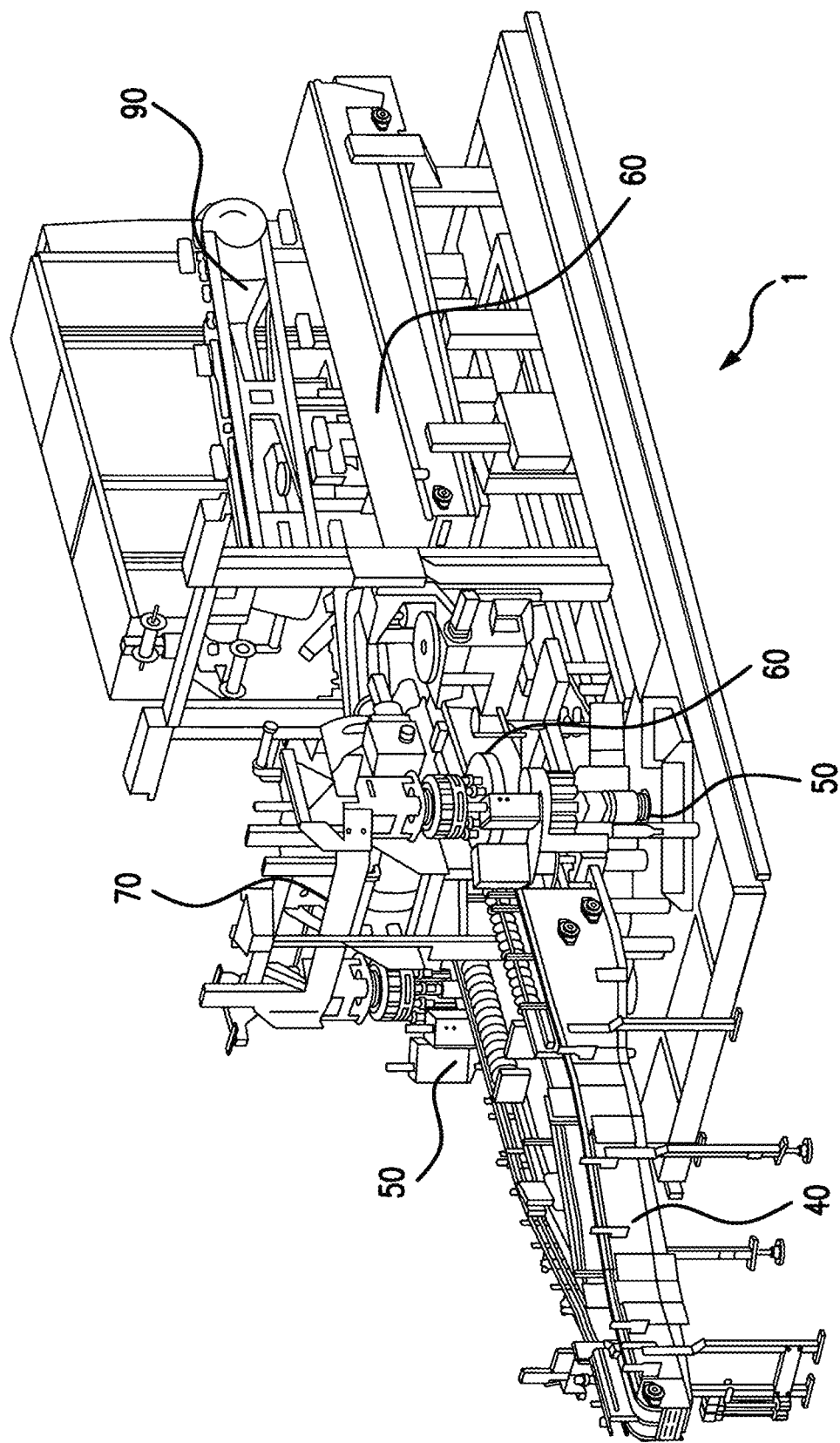
FIG. 2 is a side perspective view of the packaging machine shown in FIG. 1.

FIGS. 1-2 show a packaging machine 10 for unitizing containers 20 in a container carrier 30 and FIGS. 3-7 more particularly show a variable pitch starwheel 60 for transfer of containers 20 within the packaging machine 10. The variable pitch starwheel 60 as described is preferably used in connection with traditional packaging machines for applying a generally continuous string of container carrier 30 to a plurality of containers 20. Container carriers 30 may be, though not necessarily, formed from an elastic thermoplastic material having a plurality of container receiving openings, each for engaging a container 20. Alternatively, other packaging known to those having ordinary skill in the art, such as paperboard, shrinkwrap, cartoning, gluing and/or other unitization and/or joining methods may be used in connection with the system.

In one example of a packaging machine according to the present invention, as shown in FIGS. 1 and 2, an inlet conveyor 40 feeds the plurality of containers 20 into packaging machine 10 having an orienter 50, a starwheel 60 and a jaw drum 70. The jaw drum 70 preferably spreads the container carrier 30 and engages each container 20 with the container receiving opening. When the container carrier 30 is stripped off the jaw drum 70, the container carrier 30 elastically retracts around each container 20 and tightly engages the plurality of containers 20. Absent the orienter 50, or a similar system for orienting containers, each container 20 is rotationally positioned in a generally random orientation. In alternative examples of such traditional packaging machines, the inlet conveyor 40 feeds the plurality of containers 20 into paperboard carriers that are glued or otherwise sealed or into plastic sleeves that are shrunk wrapped or otherwise sealed.

Container carriers 30 preferably moves through the packaging machine 10 from a reel stand where carriers 30 are dispersed in a continuous string of carrier stock from either reels or large boxes of carrier stock and ultimately to packages where each carrier is separated into a unitized package, each package containing a plurality of uniform containers. A typical configuration for a package is a "six-pack" containing two longitudinal rows of containers in three transverse ranks. Additional desired packages such as four-packs, eight packs and twelve packs may be unitized using machine 10 according to this invention, and such additional sizes of packages are limited only by the consumer market for such additional sizes.

Carrier 30 (and carrier stock) is preferably constructed from a flexible plastic sheet, such as low-density polyethylene or a blend containing similar desirable properties. The flexible plastic sheet is punched or otherwise formed into a plurality of container receiving apertures aligned in transverse ranks and at least two longitudinal rows to form a continuous sheet of carriers.

Accordingly, a plurality of containers is provided from the inlet conveyor 40 and ultimately to the jaw drum 70 for application of the container carriers 30 to containers 20. As described, the jaw drum 70 may be positioned with respect to the inlet conveyor 40 to accept the plurality of containers 20. The carrier 30 proceeds from a reel stand, carton and/or infeed to the jaw drum 70, particularly to a plurality of jaw pairs located radially about the jaw drum 70. The jaw drum 70 preferably comprises a cylindrical member rotatable about a horizontal axis which transports the carrier 30 to the plurality of containers 20 which flow through the jaw drum 70. As the jaw pairs move with the rotation of jaw drum 70, container receiving apertures within the carrier 30 stretch to accommodate a container 20. The carrier 30 in a stretched condition is positioned over a plurality of containers so that each container receiving aperture engages with one container. Upon engagement with the containers 20, the carrier 30 is released from the respective jaw pair and grips a perimeter of container.

An output conveyor 80 preferably conveys the containers 20 longitudinally from the jaw drum 70 after the carrier 30 has been applied. After the carrier 30 is stripped from the jaw drum 70, a continuous string of unitized containers proceeds along the output conveyor 80 and through a cutoff device 90. According to a preferred embodiment of this invention, the cutoff device 90 is adjustable and/or replaceable with minimal use of tools to divide packages into any number of desired sizes.

The system according to one preferred embodiment of this invention preferably cooperates with the inlet conveyor 40 and the jaw drum 70. An orienter 50 as described preferably accepts a plurality of containers 20 from the inlet conveyor 40. The orienter 50 preferably singularizes each container 20 and then rotates each container 20 into a desired rotational position to the starwheel 60. According to one preferred embodiment of this invention, and as shown in FIGS. 1 and 2, the inlet conveyor 40 preferably branches into two single file rows of containers 20 each with their own orienter 50 and starwheel 60 before the two rows merge back together at the jaw drum 70.

The plurality of containers 20 from inlet conveyor 40 are preferably fed into the orienter 50, as described. The orienter 50 is preferably generally round with a plurality of radially spaced recesses formed within a perimeter, each recess configured to accept one container 20 of the plurality of containers 20. Therefore, the orienter 50 preferably initiates or maintains singularization of the plurality of containers 20 into separate recesses.

Figure 6:
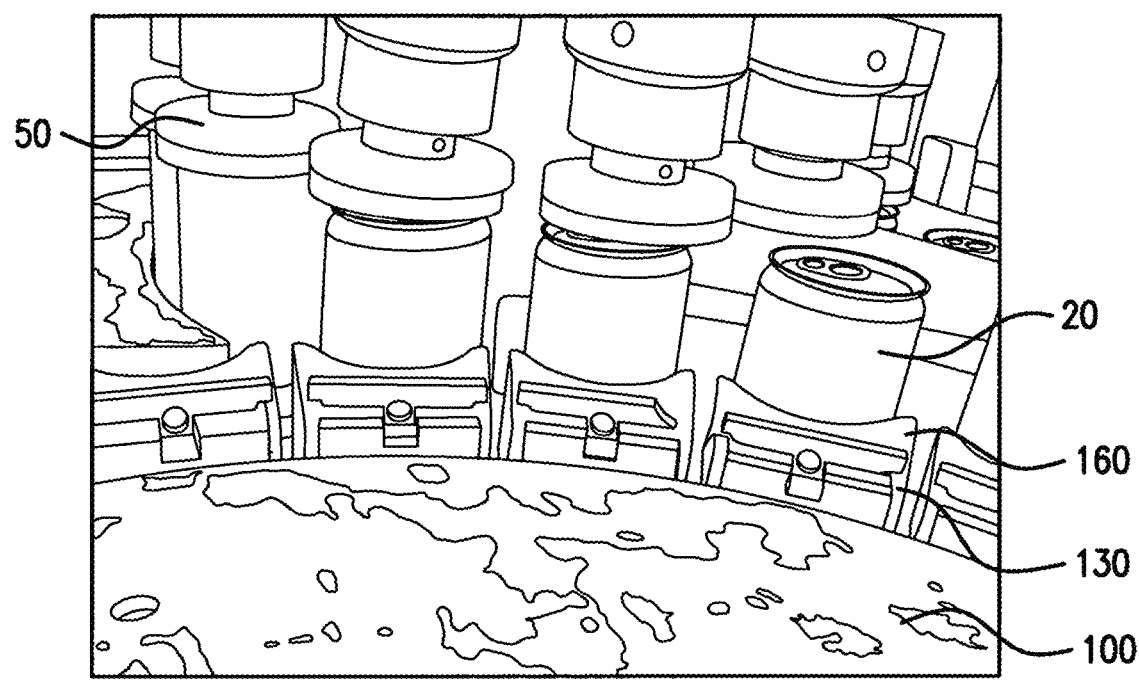
FIG. 6 is a side view of a variable pitch starwheel at a transfer point from a container orienter.

According, to one preferred embodiment of this invention, one or more recesses of the orienter 50 further includes a chuck for engaging one end of the container 20. As best shown in FIG. 6, the chuck preferably comprises a flexible contact to maintain pressure against the container 20. Alternatively, a sleeve having an internal cavity may be formed to engage an end of the container 20 in flush and/or mating contact. Flush, and preferably mating, contact is formed between the chuck and the container so that the container 20 rotates in synchronization with the chuck. According to one preferred embodiment of this invention, each recess further includes a pressure plate securing an opposite end of the container 20 from the chuck.

As a result, a container, such as a can, is firmly engaged between the chuck and the pressure plate. The pressure plate preferably, though not necessarily, comprises a generally flat, smooth surface that permits rotation of a bottom of the container. A motor is preferably mechanically coupled to the chuck to rotate the container. At least one sensor, such as a photocell, may be additionally connected with respect to the orienter 50 for locating the oriented position of container 20 and stopping the rotation of the container 20.

As a result, the motor fixes the orientation of the container 20 within the respective position in the orienter 50. Accordingly, the orienter 50 individually and independently places an oriented container 20 at a pickup location for the starwheel 60.

As shown in FIGS. 1-7, the starwheel 60 is preferably connected with respect to the orienter 50. The starwheel 60 transfers an oriented container 20 in a fixed rotational position from the orienter 50 to the jaw drum 70. The starwheel 60 preferably grips the oriented container 20 with sufficient force to prevent rotation as the oriented container 20 slides along a stationary floor or against a stationary wall of the system.

As shown in the figures, a system according to this invention preferably comprises two orienters 50 and two starwheels 60 which together result in the orientation and transfer of two rows of containers 20. This arrangement speeds up the packaging process and also cooperates with typical packaging machines 10 that accept two rows of containers 20.

The starwheel 60 also referred to herein as the "transfer device" is best shown in FIGS. 3-7 and preferably includes a central wheel 100. A radial position cam 110 is preferably positioned relative to the central wheel 100. Likewise, an angle position cam 120 is preferably positioned relative to the central wheel 100.

Figure 3:
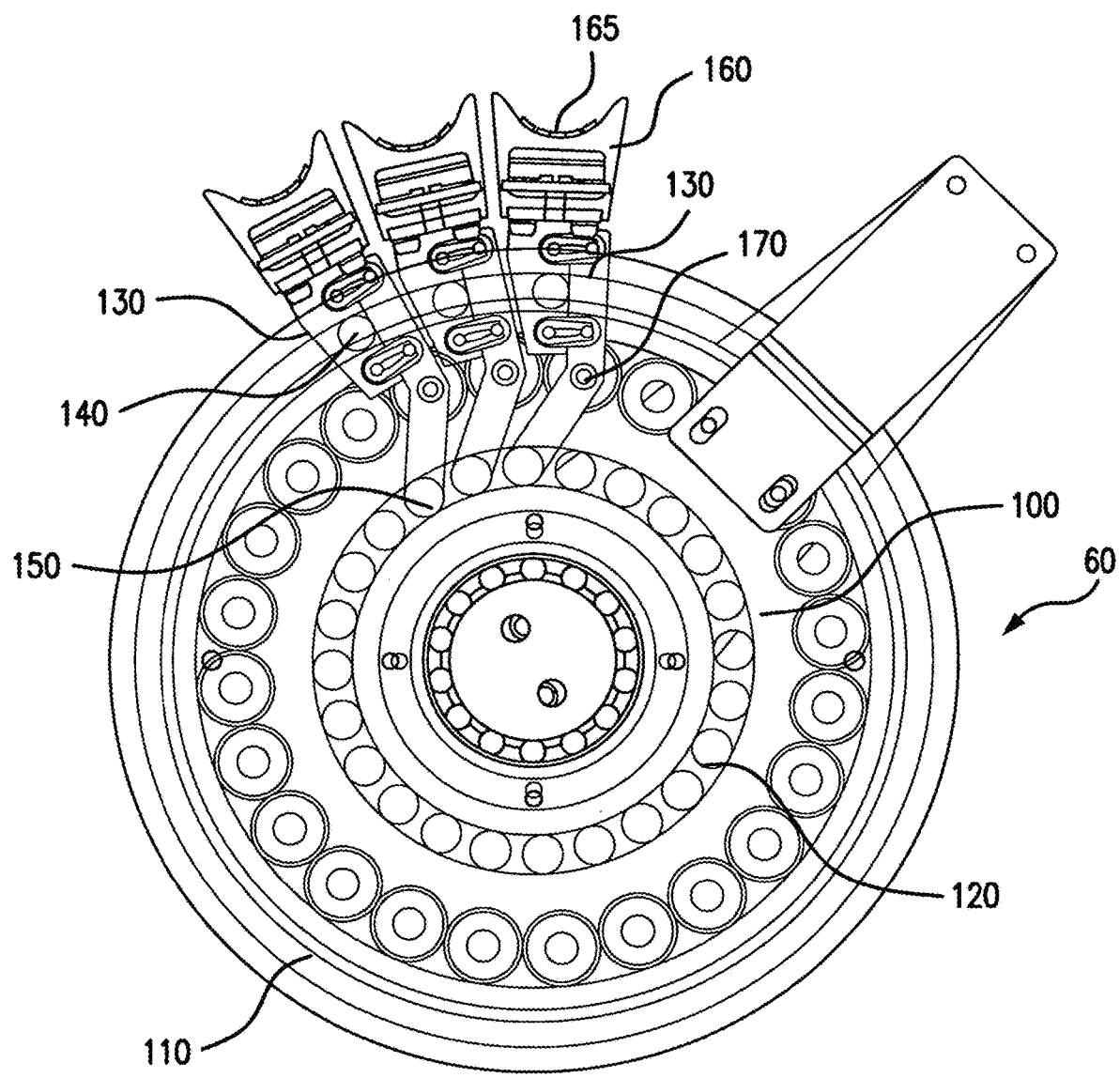
FIG. 3 is a partial cutaway top view of a variable pitch starwheel according to one preferred embodiment of this invention.
Figure 4:
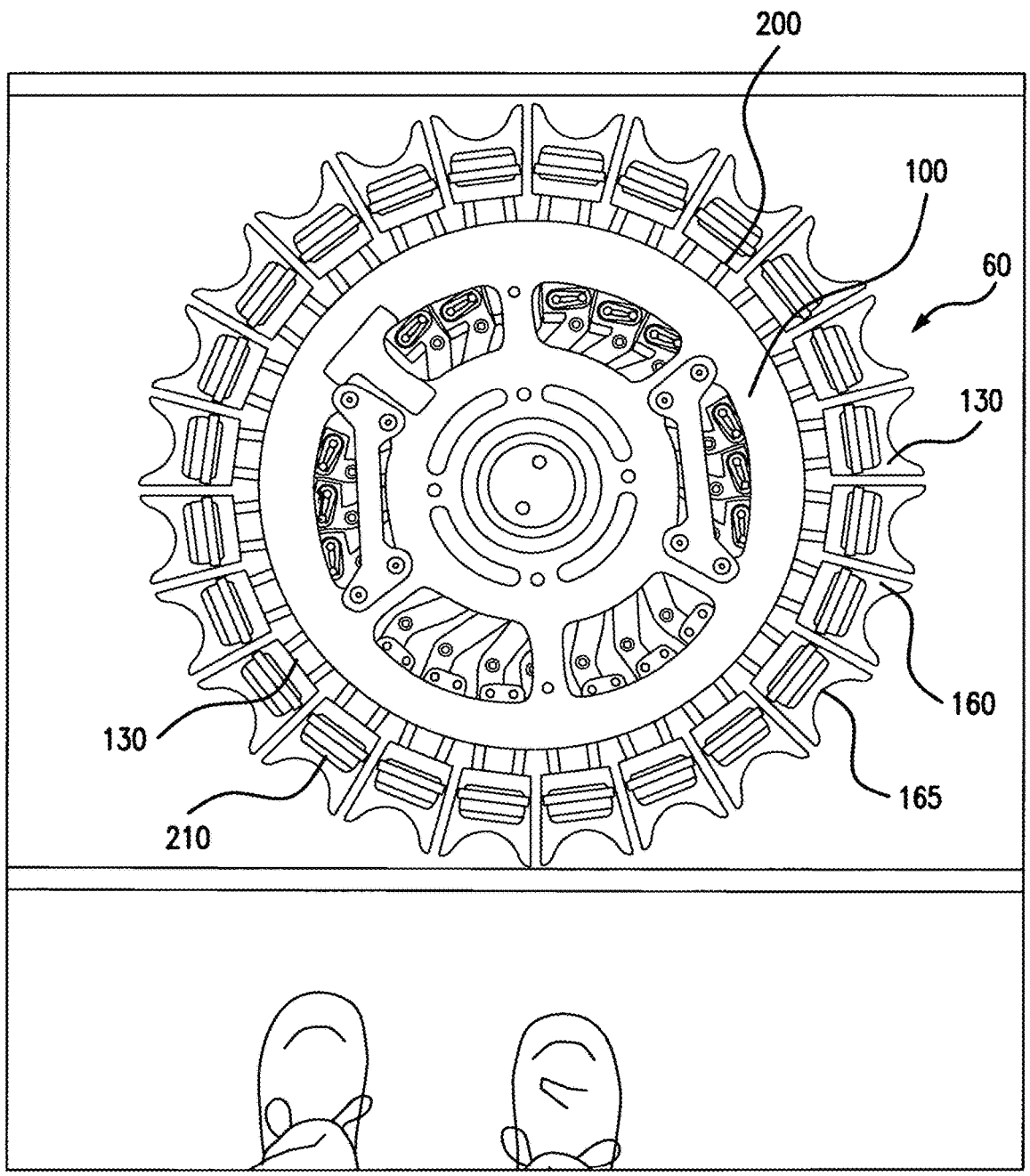
FIG. 4 is a top view of a variable pitch starwheel according to one preferred embodiment of this invention.

As shown in FIGS. 3 and 4, a plurality of can grippers 130 are arranged around the central wheel 100. Although the term "can" is used in association with the term "can gripper 130," it is understood that bottles or other containers 20 may be engageable with the starwheel 60 and/or the can grippers 130 as described. The can grippers 130 are preferably configured to accommodate containers having diameters between approximately 2 inches and approximately 3 inches.

Figure 5:
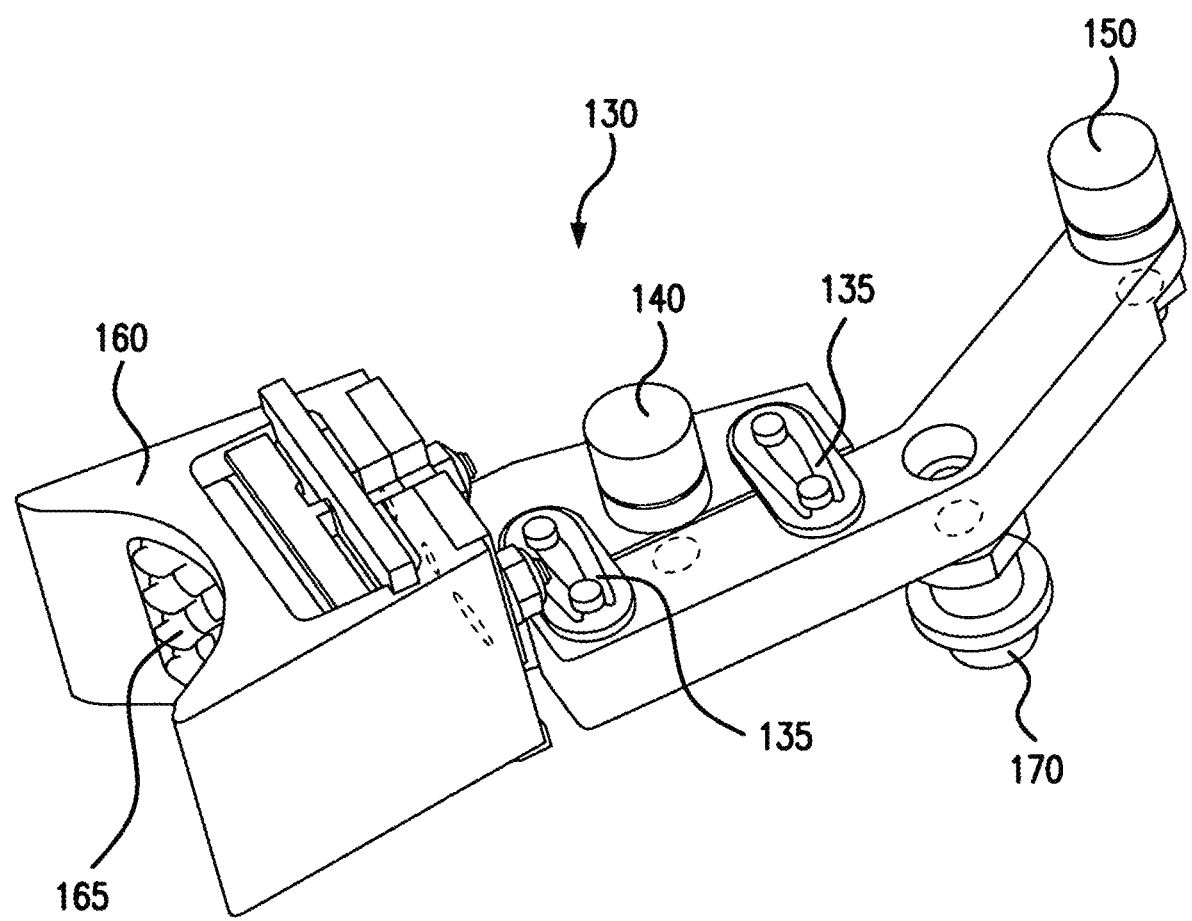
FIG. 5 is a top perspective view of a gripper according to one preferred embodiment of this invention.

As best shown in FIG. 5, each can gripper 130 preferably includes a radial follower 140 that engages with the radial position cam 110 and an angle follower 150 that engages with the angle position cam 120. Each cam gripper therefore includes a radial follower 140 that moves with the radial position cam 110 to adjust a radial position of the can gripper 130 as it rotates around the central wheel 100 and an angle follower 150 that moves with the angle position cam 120 to adjust an angular position of the can gripper 130 as it rotates around the central wheel 100. As shown in FIG. 4, a radial distance from a center of the center wheel 100 changes as each can gripper 130 rotates around the center wheel 100. Likewise, a spacing between each adjacent can gripper 130 changes as each can gripper 130 rotates around the center wheel 100.

As shown in FIG. 4, a pickup location 200 includes a first pitch and a first centerline of the respective can gripper 130 and a dropoff location. 210 includes a second pitch and a second centerline of the respective can gripper 130. According to a preferred embodiment of the invention, each adjacent can gripper 130 is in movement relative to each other adjacent can gripper 130 between the pickup location 200 and the dropoff location 210 and is generally static between each adjacent can gripper 130 during travel from the dropoff location 210 and the pickup location 200.

One or more links 135 are preferably positioned between the radial follower 140 and the angle follower 150 to permit pivotal movement of the can gripper 130 as it traces around the central wheel 100.

As further shown in FIG. 5, each can gripper 130 may further include a gripper head 160 positioned at one end. The gripper head 160 is preferably generally arcuate in shape to correspond with an outer surface of a container 20 and may include a tactile gripping surface 165. The gripping surface 165 may be replaceable using a removable plate or similar arrangement as shown in FIG. 5. A quick change feature to facilitate tool-less removal and replacement may be incorporated into the can gripper 130 to permit changeover and/or replacement of the can gripper 130 and/or individual components thereof.

In addition, each can gripper 130 may include a pivot follower 170 extending from each can gripper 130. The pivot follower 170 preferably comprises a pin that engages with a corresponding shaft in the central wheel 100 to permit each can gripper 130 to pivot and move in accordance with the radial position cam 110 and/or the angle position cam 120, as best shown in FIG. 3.

In accordance with the arrangements described above, the plurality of can grippers 130 are thereby positioned radially around the central wheel 100 and positionable between a constant pitch and a variable pitch between each adjacent can gripper 130. For instance, as shown in FIG. 4, the can grippers 130 are preferably positioned at a constant pitch between an infeed and an outfeed and a variable pitch between the outfeed and the infeed. As shown, the infeed is approximately 135 degrees from the outfeed.

In the context of the applicating machine 10 described herein for applying a flexible carrier 30 to a plurality of containers 20 provided from an infeed, the transfer device 60 preferably moves oriented containers from the orienter 50 to the jaw drum 70 from a first pitch to a second pitch wherein the first pitch is greater than the second pitch. This is possible, in part, because the transfer device 60 is preferably moveable in a rotational and a radial direction.

Figure 7:
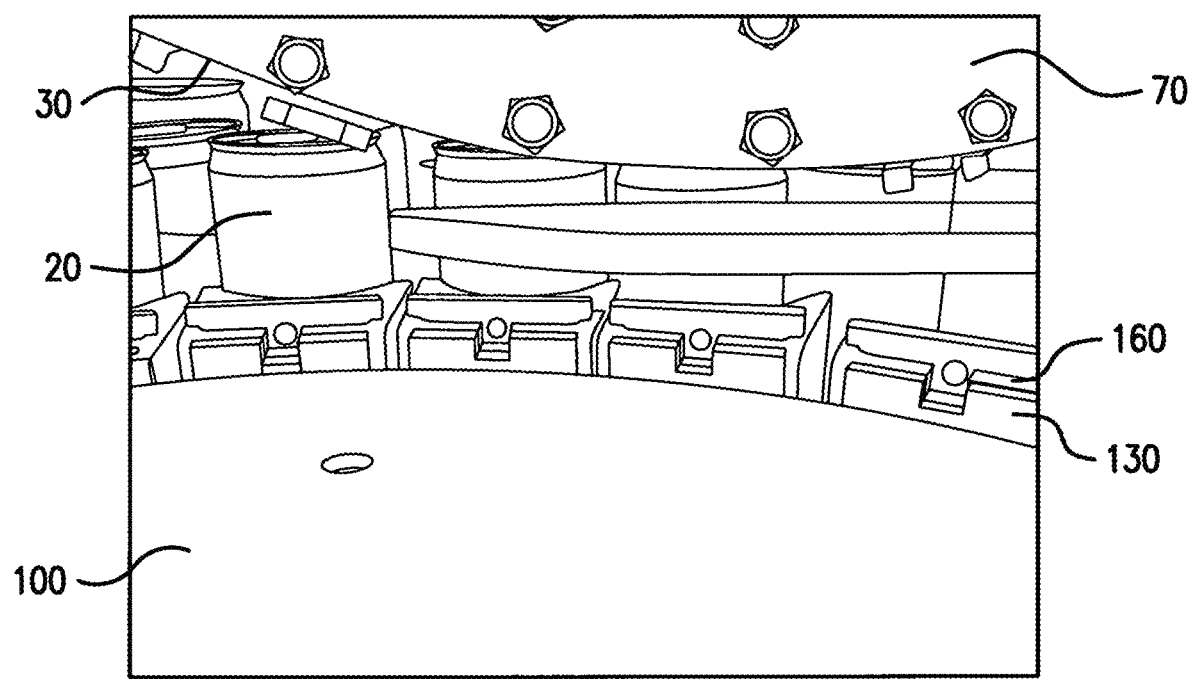
FIG. 7 is a side view of the variable pitch starswheel shown in FIG. 6 at a transfer point to an applicating drum.

In accordance with the above description, a corresponding method for packaging a generally continuous string of container carrier 30 and containers 20 includes providing a generally continuous string of container carrier 30 and containers 20 to a transfer device 60 at a first pitch and a first centerline. FIG. 6 shows a transfer between the orienter 50 and the starwheel 60 at the pickup location and FIG. 7 shows a transfer between the starwheel 60 and the jaw drum 70 at the dropoff location. It is observed that the pitch between adjacent can grippers 130 is larger at the pickup location shown in FIG. 6 than the pitch shown in FIG. 7 at the dropoff location. Likewise, the centerline of the respective can grippers 130 at the pickup location is different from the centerline of the respective can grippers 130 at the dropoff location.

The containers are transferred in a fixed angular position through the transfer device 60 to a second pitch and a second centerline and subsequently applied with the container carrier to create unitized packages of containers. Specifically, in one preferred embodiment, a plurality of can grippers 130 are moved in an angular and radial direction as the can grippers rotate 130 around the transfer device 60.

Accordingly, the starwheel 60 or transfer device may transfer each container 20 in a common or generally identical angular position to each adjacent container for placement in the carrier 30. Alternatively, each container 20 may be fixed in a different angular position to each adjacent container 20 to create a cohesive "billboard" effect on the resulting package.

While in the foregoing specification this invention has been described in relation to certain preferred embodiments thereof, and many details have been set forth for purpose of illustration, it will be apparent to those skilled in the art that the system and method according to this invention are susceptible to additional embodiments and that certain of the details described herein can be varied considerably without departing from the basic principles of the invention.

It is claimed:

1. A transfer device for transferring containers in a fixed rotational position, the transfer device comprising:
   a central wheel;
   a radial position cam positioned relative to the central wheel;
   an angle position cam positioned relative to the central wheel;
   a plurality of can grippers arranged around the central wheel, each can gripper having both a radial follower that engages with the radial position cam to adjust a radial position of the can gripper and an angle follower that engages with the angle position cam to adjust an angular position of the can gripper; and
   one or more links positioned on each can gripper between the radial follower and the angle follower to permit pivotal movement of the can gripper as it traces around the central wheel.

2. The transfer device of claim 1 further comprising:
   a gripper head positioned at one end of each can gripper of the plurality of can grippers, the gripper head including a tactile gripping surface.

3. The transfer device of claim 1 further comprising:
   a pivot follower extending from each can gripper.

4. The transfer device of claim 1 wherein the can grippers are configured to accommodate containers having diameters between approximately 2 inches and approximately 3 inches.

5. The transfer device of claim 1 wherein the plurality of can grippers are positioned radially around the central wheel and positionable between a constant pitch and a variable pitch.

6. The transfer device of claim 1 wherein the can grippers are positioned at a constant pitch between an infeed and an outfeed and a variable pitch between the outfeed and the infeed.

7. The transfer device of claim 6 wherein the infeed is less than 180 degrees from the outfeed.

8. The transfer device of claim 6 wherein the infeed is approximately 135 degrees from the outfeed.

9. The transfer device of claim 1 further comprising 24 can grippers positioned around a perimeter of the central wheel.

\* \* \* \* \*